United States Patent
Peterson et al.

(10) Patent No.: US 12,141,641 B2
(45) Date of Patent: Nov. 12, 2024

(54) SOFTWARE APPLICATION IDENTIFICATION FOR DEVICE

(71) Applicant: Lenovo (Singapore) Pte. Ltd., Singapore (SG)

(72) Inventors: Nathan Peterson, Oxford, NC (US); Russell Speight VanBlon, Raleigh, NC (US); Arnold Weksler, Raleigh, NC (US); Mark Delaney, Raleigh, NC (US); John C Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 203 days.

(21) Appl. No.: 17/853,275

(22) Filed: Jun. 29, 2022

(65) Prior Publication Data

US 2024/0005107 A1    Jan. 4, 2024

(51) Int. Cl.
*G06K 7/10* (2006.01)
*G06F 8/61* (2018.01)
*G06K 19/07* (2006.01)
*H04B 5/77* (2024.01)
*H04W 4/06* (2009.01)

(52) U.S. Cl.
CPC ........... *G06K 7/10297* (2013.01); *G06F 8/61* (2013.01); *G06K 19/0723* (2013.01); *H04B 5/77* (2024.01); *H04W 4/06* (2013.01)

(58) Field of Classification Search
None
See application file for complete search history.

(56) References Cited

U.S. PATENT DOCUMENTS

2017/0272824 A1* 9/2017 Bunner .............. H04N 21/8586

* cited by examiner

*Primary Examiner* — Thomas S McCormack
(74) *Attorney, Agent, or Firm* — FERENCE & ASSOCIATES LLC

(57) ABSTRACT

One embodiment provides a method, the method including: reading, using a device application identification system of an information handling device of a user, an identifier broadcast by a device, wherein the device is enabled to communicate with other devices within a network of devices; identifying, using the device application identification system and based on the identifier, a software application corresponding to the device; and presenting, using the device application identification system, the software application to the user. Other aspects are claimed and described.

18 Claims, 3 Drawing Sheets

SOFTWARE APPLICATION IDENTIFICATION FOR DEVICE

BACKGROUND

More and more devices are being designed as devices that can communicate with other devices, for example, over a wireless communication channel. For example, light switches, light bulbs, electrical outlets, thermostats, door locks, video doorbells, security systems, and the like, are all being designed with communication abilities that allow them to communicate with other devices having similar communication abilities. This mesh of devices able to communicate with each other is commonly referred to as an Internet of Things (IOT), with each of the devices within the network being referred to as IOT devices or smart devices. These devices allow a user to control different functions or features of the building where the devices are located through other devices, for example, digital assistant devices, portable information handling devices, software applications accessible via an information handling device, and/or the like. For example, instead of having to physically controlling a light switch, the user can simply provide a voice command to control the function of the light switch.

BRIEF SUMMARY

In summary, one aspect provides a method, the method including: reading, using a device application identification system, an identifier broadcast by a device, wherein the device is enabled to communicate with other devices within a network of devices; identifying, using the device application identification system and based on the identifier, a software application corresponding to the device; and presenting, using the device application identification system, the software application to a user.

Another aspect provides an information handling device, the information handling device including: a processor; a memory device that stores instructions that, when executed by the processor, causes the information handling device to: read, using a device application identification system, an identifier broadcast by a device, wherein the device is enabled to communicate with other devices within a network of devices; identify, using the device application identification system and based on the identifier, a software application corresponding to the device; and present, using the device application identification system, the software application to a user.

A further aspect provides a product, the product including: a computer-readable storage device that stores executable code that, when executed by a processor, causes the product to: read, using a device application identification system, an identifier broadcast by a device, wherein the device is enabled to communicate with other devices within a network of devices; identify, using the device application identification system and based on the identifier, a software application corresponding to the device; and present, using the device application identification system, the software application to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
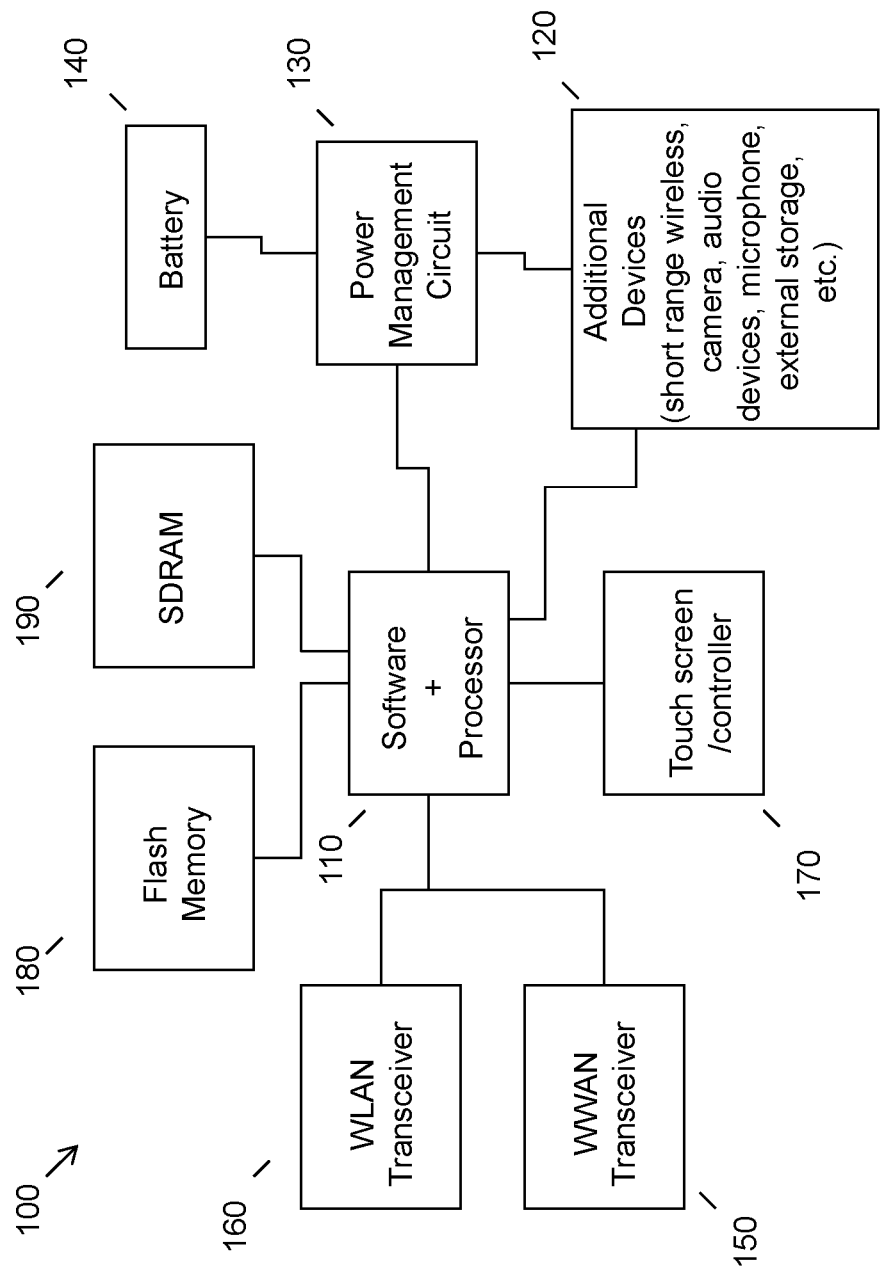
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users find it desirable to be able to control multiple devices through a single device, voice command, gestures, and/or the like. Thus, smart devices and the Internet of Things is desirable and very appealing to many users. In many cases, the user does not even have to be in the building or space where the device is located in order to control features or functions of the device. For example, a user can control lights, outlets, appliances, and/or the like, using an application on a mobile device from a remote location. However, in order to use these devices, the user has to have the correct software application to control these devices. The software application is usually provided by the manufacturer, whether directly or indirectly.

Generally, the user downloads or installs from an application store. The user can then access the application from the information handling device (e.g., smart phone, tablet, smart watch, digital assistant device, smart speaker, etc.) where the application is installed or through another device that has access to the information handling device where the application is installed. For example, digital assistant devices, smart speakers, and/or the like, may not have integrated displays or other features that allow for the installation of a software application on the device itself. Rather, these applications are generally installed on another device, a central device, and/or the like, that is accessible to the device, thereby allowing the device to access the application.

Once the software application for a device is installed or accessible to an information handling device, a user can use the software application to configure the device, facilitate device updates, register the device, control the device, and/or the like. However, determining which software application to install or open to communicate with a particular device can be difficult. For example, if a different user attempts to communicate with a device, but does not know any information about the device, for example, manufacturer, device model, and/or the like, the user may not know which software application corresponds to the device.

As another example, while a user may originally have known the information corresponding to the device, the user may forget this information and may find it difficult to identify which software application should be accessed for the device. This is particularly noticeable when a user has devices from different manufacturers, each having their own corresponding software application. Identifying the information needed to identify the correct software application can be difficult, particularly when these devices are installed and the device information is no longer visible unless the device is exposed or uninstalled. Currently, there is no simple technique for identifying this information. Rather, the user has to either expose the information if the device has never been associated with the information handling device, or open multiple software applications searching for the correct one that controls the target device.

Accordingly, the described system and method provides a technique for identifying and presenting a software application for a device enabled to communicate with other devices within a network of devices based upon an identifier of the device that is read by an information handling device. The device application identification system reads an identifier broadcast by a device. The device will be referred to as a "target device" for ease of readability and to minimize confusion with the information handling device employing the device application identification system and providing access to the software application for the target device. The target device is a device that is enabled to communicate with other devices within a network of devices. The network of devices is commonly referred to as an Internet of Things (IOT), with devices in the network being referred to as IOT devices or smart devices.

Based upon the identifier, the device application identification system identifies a software application that corresponds to the target device. The software application is an application that can be accessed on or by an information handling device and used to configure, control, update, and/or perform other functions of the target device. The software application is presented to the user, either on the information handling device or on an operatively coupled display or output device. Presenting the software application to the user may include presenting the software application for installation on the information handling device or a coupled information handling device. If the software application is already installed on the information handling device or accessible location, presenting the software application may include opening the application.

Therefore, a system provides a technical improvement over traditional methods for identifying a software application for a device. Conventional techniques do not provide a simple solution for identifying information about a device that would allow a user to determine what software application corresponds to the device. Rather, the user has to expose the device information or, in the event that the device was previously associated with an information handling device, open multiple software applications to find the correct application. In some cases, this is annoying and time-consuming, and in other cases it can be costly due to the need to hire a professional to expose the device information. Thus, the described system and method, by allowing a user to read identifying information from the device using an information handling device, provides a technique that greatly simplifies and reduces time, and sometimes, cost associated with identifying the correct software application. Additionally, the described system and method further simplifies the process for identifying a corresponding software application by presenting the correct software application to a user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
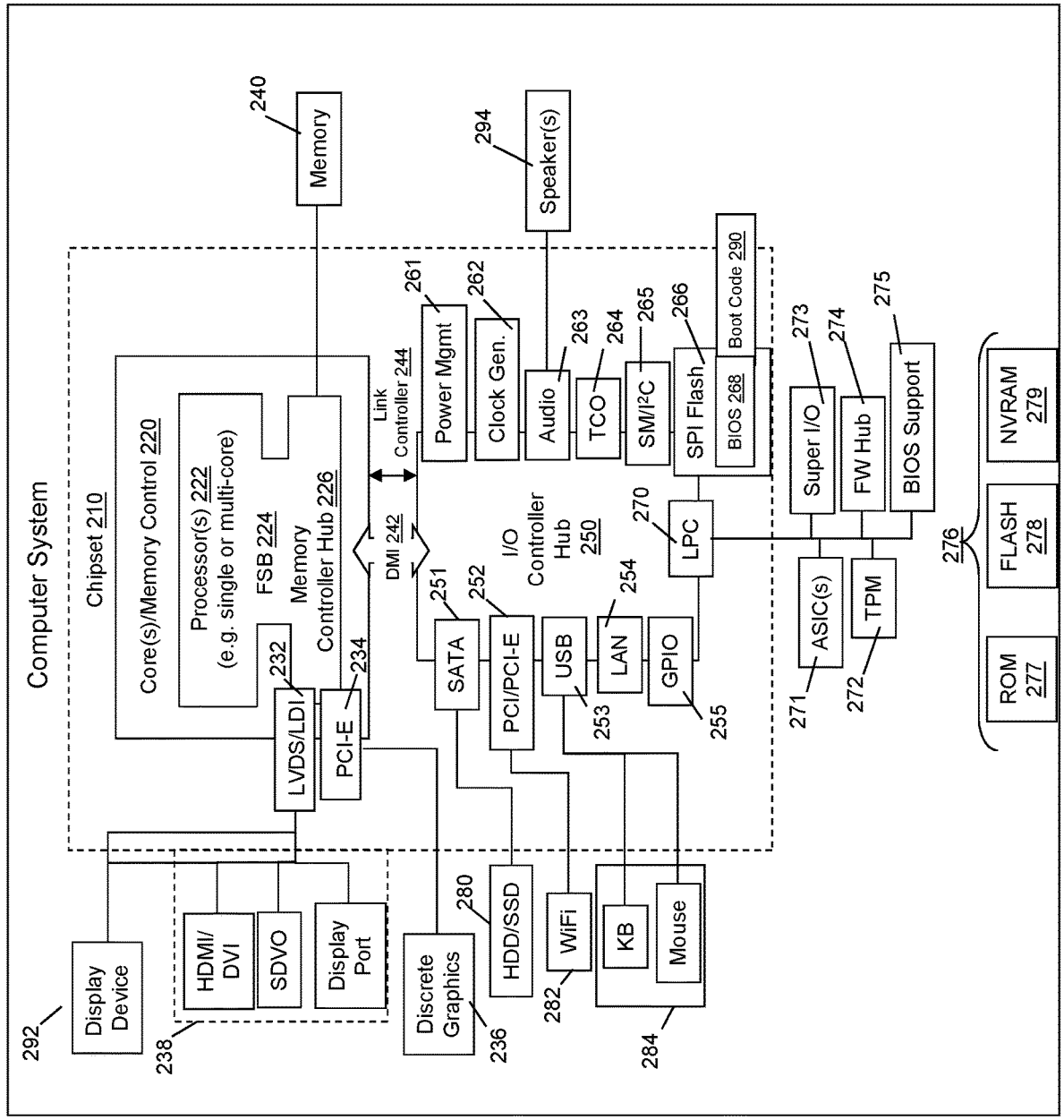
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that read identifiers from devices identifying and present software applications corresponding to the devices. For example, the circuitry outlined in FIG. 1 may be implemented in a tablet or smart phone embodiment, whereas the circuitry outlined in FIG. 2 may be implemented in a personal computer embodiment.

Figure 3:
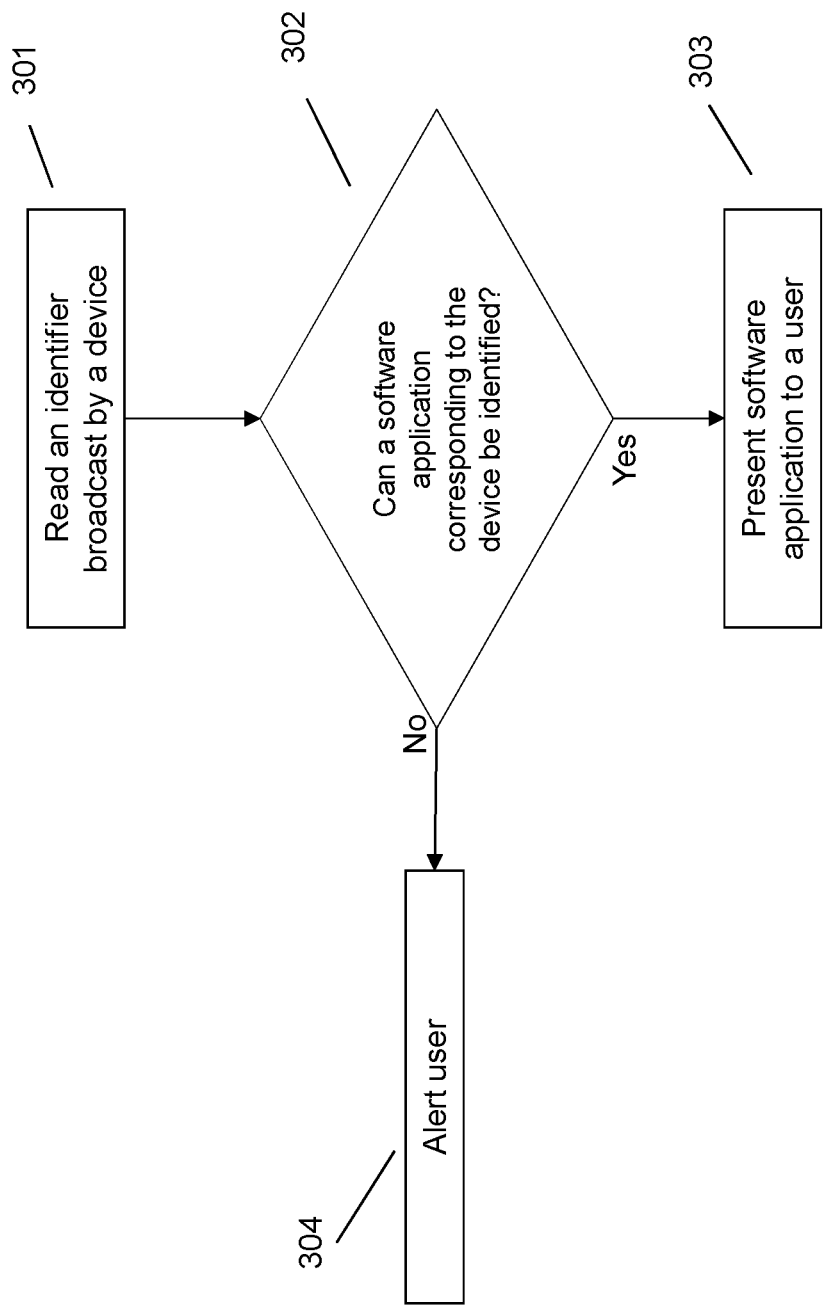
FIG. 3 illustrates an example method for identifying and presenting a software application for a device enabled to communicate with other devices within a network of devices based upon an identifier of the device that is read by an information handling device.

FIG. 3 illustrates an example method for identifying and presenting a software application for a device enabled to communicate with other devices within a network of devices based upon an identifier of the device that is read by an information handling device. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to identify and present a software application for a device. Additionally, the device application identification system includes modules and features that are unique to the described system.

The device application identification system may be installed on an information handling device that is directly used to read identifiers of devices, for example, portable information handling devices (e.g., smart phone, smart watch, tablet, personal digital assistant, laptop, etc.), information handling devices having broadcast receivers installed (e.g., personal computers, digital assistant devices, smart appliances, other IOT devices, etc.), and/or the like. Additionally, or alternatively, the device application identification system may be installed on an information handling device that communicates with a transmission reader, which may be included on an information handling device.

For example, a digital assistant device such as a smart speaker, does not have an integral display device. Additionally, most of the data that is stored and associated with the digital assistant device is stored in a remote data storage location, for example, network storage, cloud storage, and/or the like. Accordingly, applications needing to be stored and displayed are not stored on these devices and cannot be displayed on these devices. Rather, these devices will communicate with other devices and data storage locations to display information and access stored information. Thus, in this example, the device application identification system would likely, at least not wholly, be installed and stored on the device itself. Additionally, any visual output presented by the device application identification system would not be provided at the device itself. Rather, the device may provide instructions for accessing the device application identification system, performing the steps needed for facilitating the described method, and for displaying output presented by the device application identification system.

Additionally, some components or sensors may be needed for performing some of the described steps, for example, reading the identifier broadcast by the target device. Some information handling devices may not be equipped with the necessary components or sensors, but may still be used to identify and present a software application to the user. In this case, the information handling device may communicate with another device or sensor that has the sensor or device needed for performing the described steps. In other words, the described method of the device application identification system may be performed by a system of information handling devices, other devices, and/or sensors, and not be a single device. For example, a smart watch may be used to read an identifier broadcast by a device and the identifier may be transmitted to a laptop that is used to identify the software application and present the software application to the user.

Along these lines, while some information handling devices may be equipped to perform all of the described steps, a user may want to perform different steps on different information handling devices. Thus, the user may access the device application identification system on multiple devices with the obtained information being shared between the information handling devices. Generally, but not strictly necessarily, these information handling devices may be included in the Internet of Things. The device application identification system may work in conjunction with the operating system of an information handling device, an application store where software applications can be identified, selected, and installed, a combination of both, and/or the like.

At 301, the device application identification system reads an identifier broadcast by a device, referred to as the target device. Example target devices may include, appliances, outlets, light switches, thermostats, security systems, doorbells, door locks, and other devices that may be connectable to networks or other devices, thereby facilitating communication between the target device and other devices, information handling devices, network devices, digital assistant devices, and/or the like. Thus, the target device is enabled to communicate with other devices within a network of devices. However, it should be noted that at this point the target device may or may not be actually communicating with other devices within a network of devices. The target device may already be connected into a network of devices. In this case, the target device may be communicating with other devices in the network of devices. On the other hand, the target device may not yet be connected into the network, for example, when the device is first installed and not configured or connected to the network, when network information has changes and the device is not yet updated, and/or the like. In this case, the target device is not yet communicating with other devices in the network of devices.

Similarly, the target device may be a device previously known to the information handling device or may be a device that is unknown to the information handling device. As an example of a previously known device, a user may have previously installed and configured the target device, but may have forgotten which software application corresponds to the target device. As an example of an unknown device, a user may have just installed the target device and may not know which software application corresponds to the target device. As another example, a target device may have been installed by another user and a new user does not know which software application corresponds to the target device. It should be noted that while a single information handling device will be referred to herein, as previously discussed, the described system may actually use one or more information handling devices and/or sensors. Thus, the information handling device described herein may actually be a system of devices and/or sensors that can communicate with each other, either directly or indirectly.

The target device may include a chip, tag, or other identification device that may contain information about the target device. For example, the target device may include a near-field communication (NFC) chip, transmitter, wireless communication mechanism, identification tag, and/or the like. For ease of readability, the identification device that will be referred to throughout is an identification tag. However, this is not intended to limit the identification device to a tag as any type of identification mechanism or device can be included in the target device. The identification tag may include one or more pieces of identification data, for example, a manufacturer of the target device, a model of the target device, a software or firmware version of the target device, a serial number of the target device, an identification number of the target device, a configuration of the target device, and/or the like. This information will generally be referred to as an identifier. The identifier may include single pieces of identification information, multiple pieces of identification information, pieces of identification information not specifically delineated in the list above, and/or the liked. Additionally, different target devices may have different identification information stored on and transmitted by the identification tag.

It should be noted that the identification tag may be an active or passive tag. In an active tag, the target device provides power to the identification tag so that the identifier can be actively transmitted by the target device. However, the identifier may not be broadcast all the time. Rather, the identifier may only be transmitted or broadcast when a signal is received requesting the identifier. Otherwise, the identifier may be broadcast all the time, during particular time frames, when certain conditions are met, and/or the like. In a passive tag, the target device does not provide power to the identification tag. Rather, when a signal is received by the identification tag from a reader, the identification tag uses the transmission signal to power the identification tag so that the identifier can be transmitted to the reader.

Reading the identifier broadcast by a device may be facilitated using an information handling device. The information handling device may include a reader that can read information from the identification tag. For example, if the identification tag is an NFC chip, the information handling device may include an NFC reader. The information handling device may include multiple readers that can read different types of target device identifications tags. In one example, the information handling device may include a short-range or near-field communication reader. In this example, the information handling device may be placed or located within proximity to the target device and may read the identifier. The information handling device may also include a wireless communication reader that can read wireless communications from a longer distance than the short-range or near-field communication reader. In this example, the user may provide user input indicating that an identifier should be read. In these examples, the identifier is broadcast over a wireless communication medium.

However, in some cases, and depending on the target device, the information handling device can also receive the identifier using a wired communication medium. For example, outlets may include either or both universal serial bus (USB) ports and/or power ports. These ports may allow not only power transmission, but also data transmission. Thus, when the information handling device is plugged into one of the ports, the information handling device can receive the identifier from the target device. While the example of outlets is used, other target devices may include data transmission ports.

Reading the identifier may be responsive to the user selecting an application, icon, or providing some other user input indicating that the reader should be activated. Reading the identifier may be responsive to the information handling device detecting that an identifier is being broadcast. Reading the identifier may be responsive to detection of the target device being connected to, for example, through a wired connection, the information handling device. When the identification tag is read by an identification reader, the information handling device may receive the information contained within the identification tag. For example, the information handling device may receive the identifier contained on the identification tag. Receiving the identifier may include receiving the identifier within an application store including the software application, by the operating system of the information handling device, and/or other location, application, data store, and/or the like, that may facilitate the device application identification system.

At 302, the device application identification system determines if a software application corresponding to the target device can be identified. Whether the identifier is received in the application store, the operating system, or other location, may require additional steps for locating the software application corresponding to the target device. For example, in the case that the identifier is received directly within the application store, the application store may search applications using the identifier to find a software application, if any, that corresponds to the identifier obtained. As another example, in the case the identifier is received at the operating system, the operating system may facilitate the search for the software application, by providing the identifier to an application store, searching a data store accessible by the information handling device and then providing a description, title, or other identifier of the software application to the application store, and/or the like.

To identify the software application corresponding to the target device, the device application identification system may correlate the identifier with a software application. One technique for making or identifying correlations between an identifier and a software application includes utilizing a data store. The device application identification system may search a data store that may identify associations between the identifier, or information included in the identifier, and a software application. The data store may be populated with identifiers, or information contained within identifiers, and software applications that correspond to or are associated with the identifiers. The data store may be populated by device manufacturers, user provided input, crowd sourced techniques, machine-learning techniques, other techniques, a combination of techniques, and/or the like. These techniques may also be utilized without the use of a data store and may simply be used in making the correlations.

Crowd-sourced and/or machine-learning techniques may be utilized when users use software applications to configure, access, control, and/or perform other features or functions corresponding to a device. For example, when a user installs a device and then accesses the software application for the device. Upon this access, the system may create an association between the device and the software application and store the association. The system may also learn, in a type of machine-learning, associations between portions of identifiers and software applications. For example, serial numbers for devices may include a portion that correspond to a manufacturer. After making associations between identifiers and software applications, the system may learn the portion of the serial number corresponding to a manufacturer and what manufacturer is represented by that portion or the code of the portion.

Depending on the identification information included in the identifier and information needed by the application store, the system may have to perform additional steps when identifying the software application. For example, the application store may be able to identify a corresponding software application based upon a manufacturer of the target device. However, if the identification information within the identifier does not include the manufacturer, the device application identification system may need to identify the manufacturer of the target device. Thus, the device application identification system may associate the device to a manufacturer of the device. Once the manufacturer is identified, the system can identify a software application that corresponds to the manufacturer. While the example of a manufacturer has been used, this is not intended to be limiting. Other identification information can be utilized to identify the software application, for example, device type or model, serial numbers, or other identification information.

If, at 302, the device application identification system cannot identify a software application that corresponds to the target device, the system may alert the user at 304. Alerting the user may include providing a pop-up notification, providing an audible output, providing a warning, providing a recommendation, and/or the like. For example, if the identifier was not correctly read, the system may be unable to identify a software application. In this case, the system may alert the user and request the user try re-reading the identifier. In some cases, the software application may not be accessible or available to the application store. If this occurs, the system may notify the user of such.

On the other hand, if the device application identification system can identify a software application that corresponds to the target device at 302, the device application identification system, at 303, the system may present the software application to the user. Presenting the software application may include presenting the software application for installation if the software application is not already installed on or accessible to the information handling device. On the other hand, if the software application is already installed on the information handling device, presenting the software application may include opening the software application on the information handling device. Instead of automatically opening the software application, the system may provide a pop-up or indication that prompts the user to open the software application.

Presenting the software application may not only include installing or opening the software application, but may also include populating information of the target device into the software application. Populating information may include providing the device identifier in a search function or using the information to select the device in a user interface of the software application, thereby resulting in the presented user interface being a user interface unique to the target device. In other words, the target device may be selected in the software application automatically based on the device identifier, thereby allowing the user to perform desired functions associated with the target device without having to perform additional steps of searching for and/or selecting the target device within the software application. Populating the information may also include populating forms corresponding to the target device, for example, registration forms, software update forms, and/or the like. From the device identifier, the device application identification system may identify information corresponding to the device that can be used to populate fields within different forms, for example, device serial number, device model, device manufacturer, manufacture date, software or firmware version, and/or the like.

As an overall non-limiting example where the identification tag is an NFC chip, the reader is a mobile phone, and the identifier is received directly at the application store, the user may hold the mobile phone within a particular proximity to the target device. Upon detecting the identifier broadcast by the target device, the application store searches a data store or makes another correlation between the identifier and a software application. Once the software application is found, the application store presents the software application to the user, either prompting the user to open or install the software application.

As an overall non-limiting example where the identification tag is an NFC chip, the reader is a mobile phone, and the identifier is received at the operating system of the mobile phone, the user may hold the mobile phone within a particular proximity to the target device. Upon detecting the identifier broadcast by the target device, the operating system searches a data store or makes another correlation between the identifier and a software application. This may include passing the identifier to the application store and the application store making the correlation. If the operating system makes the software application identification, the operating system may pass an identification of the software application to the application store.

Once the software application is identified within the application store, either by the operating system passing the software application identification to the application store or the application store making the identification, the application store presents the software application to the user, either prompting the user to open or install the software application. Alternatively, if the application is already installed on the device and the operating store makes an identification of the software application, the operating system may open the software application bypassing the application store.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
reading, using a device application identification system, an identifier broadcast by a device, wherein the device is enabled to communicate with other devices within a network of devices, wherein the reading comprises receiving the identifier within an application store including the software application;
identifying, using the device application identification system and based on the identifier, a software application corresponding to the device; and
presenting, using the device application identification system, the software application to a user.

2. The method of claim 1, wherein the reading comprises receiving the identifier by an operating system of the information handling device.

3. The method of claim 1, wherein the identifying comprises associating the device, based upon the identifier, to a manufacturer of the device and identifying the software application as a software application corresponding to the manufacturer.

4. The method of claim 1, wherein the identifying comprises correlating the identifier with the software application.

5. The method of claim 4, wherein the correlating comprises accessing the data store containing associations between device identifiers and software applications.

6. The method of claim 1, wherein the presenting comprises presenting the software application for installation on an information handling device responsive to determining the software application is not installed on the information handling device.

7. The method of claim 1, wherein the presenting comprises opening the software application responsive to determining the software application is already installed on an information handling device.

8. The method of claim 1, wherein the identifier is broadcast using a wireless communication device.

9. The method of claim 8, wherein the wireless communication device comprises a near field communication device and wherein the reading is responsive to the information handling device being located within a predetermined proximity to the device.

10. An information handling device, the information handling device comprising:
a processor;
a memory device that stores instructions that, when executed by the processor, causes the information handling device to:
read, using a device application identification system, an identifier broadcast by a device, wherein the device is enabled to communicate with other devices within a network of devices, wherein to read comprises receiving the identifier within an application store including the software application;
identify, using the device application identification system and based on the identifier, a software application corresponding to the device; and
present, using the device application identification system, the software application to a user.

11. The information handling device of claim 10, wherein to read identify comprises receiving the identifier by an operating system of the information handling device.

12. The information handling device of claim 10, wherein to identify comprises associating the device, based upon the identifier, to a manufacturer of the device and identifying the software application as a software application corresponding to the manufacturer.

13. The information handling device of claim 10, wherein to identify comprises correlating the identifier with the software application.

14. The information handling device of claim 13, wherein the correlating comprises accessing the data store containing associations between device identifiers and software applications.

15. The information handling device of claim 10, wherein to present comprises presenting the software application for installation on the information handling device responsive to determining the software application is not installed on the information handling device.

16. The information handling device of claim 10, wherein to present comprises opening the software application responsive to determining the software application is already installed on the information handling device.

17. The information handling device of claim 10, wherein the identifier is broadcast using a wireless communication device.

18. A product, the product comprising:
a computer-readable storage device that stores executable code that, when executed by a processor, causes the product to:
read, using a device application identification system, an identifier broadcast by a device, wherein the device is enabled to communicate with other devices within a network of devices, wherein to read comprises receiving the identifier within an application store including the software application;
identify, using the device application identification system and based on the identifier, a software application corresponding to the device; and
present, using the device application identification system, the software application to a user.

* * * * *